(12) United States Patent
Liu et al.

(10) Patent No.: US 10,726,130 B2
(45) Date of Patent: Jul. 28, 2020

(54) METHOD AND DEVICE FOR VERIFYING UPGRADE OF DIAGNOSIS CONNECTOR OF DIAGNOSTIC EQUIPMENT, AND DIAGNOSIS CONNECTOR

(71) Applicant: SHENZHEN LAUNCH SOFTWARE CO., LTD., Shenzhen, Guangdong (CN)

(72) Inventors: Jun Liu, Guangdong (CN); Xiaobing Zhao, Guangdong (CN); Wei Yan, Guangdong (CN); Guozhu Liu, Guangdong (CN)

(73) Assignee: SHENZHEN LAUNCH SOFTWARE CO., LTD., Shenzhen, Guangdong (CN)

( * ) Notice: Subject to any disclaimer, the term of this patent is extended or adjusted under 35 U.S.C. 154(b) by 270 days.

(21) Appl. No.: 15/871,884

(22) Filed: Jan. 15, 2018

(65) Prior Publication Data
US 2019/0205539 A1    Jul. 4, 2019

Related U.S. Application Data

(63) Continuation-in-part of application No. PCT/CN2017/119572, filed on Dec. 28, 2017.

(51) Int. Cl.
*G06F 21/57*  (2013.01)
*G06F 21/62*  (2013.01)
(Continued)

(52) U.S. Cl.
CPC ............ *G06F 21/57* (2013.01); *G06F 21/572* (2013.01); *G06F 21/6218* (2013.01);
(Continued)

(58) Field of Classification Search
CPC ........ G06F 21/57; G06F 21/572; G06F 21/70; G06F 21/6218; G06F 2221/2107;
(Continued)

(56) References Cited

U.S. PATENT DOCUMENTS 7,913,242 B2    3/2011  Holland
10,171,478 B2 *  1/2019  McCauley .......... H04L 63/0428
(Continued)

FOREIGN PATENT DOCUMENTS

| CN | 103577233 | 2/2014 |
| CN | 104732138 | 6/2015 |

(Continued)

OTHER PUBLICATIONS

International Search Report, issued in the corresponding PCT application No. PCT/CN2017/119572, dated Sep. 7, 2018, 5 pages.
(Continued)

*Primary Examiner* — Christopher A Revak
(74) *Attorney, Agent, or Firm* — Hamre, Schumann, Mueller & Larson, P.C.

(57) ABSTRACT

A method for verifying upgrade of diagnosis connector of diagnostic equipment is used to solve a problem that an illegal person implements an illegal upgrade for the diagnosis connector of the diagnostic equipment by cloning. The method comprises: obtaining upgrade file data sent by an upper computer of the diagnostic equipment, the upgrade file data comprises a connector upgrade file and signature information, the signature information is generated previously according to unique identification information of a designated connector and the connector upgrade file, the designated connector is the diagnosis connector corresponding to a requester that requests a server to provide the connector upgrade file; performing signature verification for the signature information in the upgrade file data according to the unique identification information of the diagnosis connector to be upgraded and the connector upgrade file; if the signature verification is passed, upgrading the diagnosis connector to be upgraded according to the connector upgrade file; and if the signature verification is not passed,
(Continued)

refusing to use the connector upgrade file to upgrade the diagnosis connector to be upgraded.

17 Claims, 5 Drawing Sheets

(51) Int. Cl.
*G06F 21/70* (2013.01)
*H04L 9/32* (2006.01)

(52) U.S. Cl.
CPC ............ *G06F 21/70* (2013.01); *H04L 9/3247* (2013.01); *G06F 2221/034* (2013.01); *G06F 2221/2107* (2013.01)

(58) Field of Classification Search
CPC .. G06F 2221/034; G06F 21/64; G06F 21/602; H04L 9/3247; H04L 63/126
See application file for complete search history.

(56) References Cited

U.S. PATENT DOCUMENTS

| | | |
|---|---|---|
| 2013/0185548 A1 | 7/2013 | Djabarov et al. |
| 2017/0060559 A1* | 3/2017 | Ye .............................. G06F 8/65 |
| 2017/0192770 A1* | 7/2017 | Ujiie ..................... B60R 16/023 |

FOREIGN PATENT DOCUMENTS

| | | |
|---|---|---|
| CN | 105468385 | 4/2016 |
| CN | 106458112 | 2/2017 |

OTHER PUBLICATIONS

The extended European search report issued in counterpart European Application No. 17832029.7, dated Jan. 2, 2020, 6 pages provided.

\* cited by examiner

METHOD AND DEVICE FOR VERIFYING UPGRADE OF DIAGNOSIS CONNECTOR OF DIAGNOSTIC EQUIPMENT, AND DIAGNOSIS CONNECTOR

TECHNICAL FIELD

The present application relates to the technical field of vehicle electronics, and more particularly, relates to a method and device for verifying upgrade of diagnosis connector of diagnostic equipment, and diagnosis connector.

BACKGROUND

With rapid development of vehicles, upgrade and iteration of vehicle models and vehicle technology, vehicular diagnostic equipments emerge in endlessly too. Wherein, a core of a diagnostic equipment of a vehicle is a diagnosis connector, and lower computer programs of the diagnosis connector are the core in the core, how to protect the lower computer programs from being illegally used becomes more and more important.

However, lower computer programs of diagnosis modules need to be upgraded so as to support diagnosis work of new model vehicles, an illegal person may implement an illegal upgrade for a diagnosis connector of the diagnostic equipment by means of cloning, thereby making the diagnosis connector to be used for illegal operation, and thus bringing a hidden danger for vehicle diagnosis.

Technical Problem

Embodiments of the present application provide a method and device for verifying upgrade of diagnosis connector of diagnostic equipment, and diagnosis connector, which can prevent an illegal person from performing an illegal upgrade for a diagnosis connector of the diagnostic equipment by means of cloning, and thereby reduce a potential risk of the diagnostic equipment.

Technical Solution

In a first aspect, a method for verifying upgrade of diagnosis connector of diagnostic equipment is provided, wherein the method for verifying upgrade of diagnosis connector of diagnostic equipment is applied in the diagnosis connector of the diagnostic equipment and comprises:

obtaining upgrade file data sent by an upper computer of the diagnostic equipment, wherein, the upgrade file data comprises a connector upgrade file and signature information, the signature information is generated previously according to unique identification information of a designated connector and the connector upgrade file, and the designated connector is the diagnosis connector corresponding to a requester that requests a server to provide the connector upgrade file;

performing signature verification for the signature information in the upgrade file data according to the unique identification information of the diagnosis connector to be upgraded and the connector upgrade file;

if the signature verification is passed, upgrading the diagnosis connector to be upgraded according to the connector upgrade file; or if the signature verification is not passed, refusing to use the connector upgrade file to upgrade the diagnosis connector to be upgraded.

Optionally, obtaining the upgrade file data sent by the upper computer of the diagnostic equipment comprises:

obtaining encrypted upgrade file sent by the upper computer of the diagnostic equipment, wherein the encrypted upgrade file is generated by encrypting the connector upgrade file that carries the signature information; and decrypting the encrypted upgrade file to obtain the upgrade file data.

Optionally, after using the connector upgrade file to upgrade the diagnosis connector to be upgraded, the method further comprises:

when an instruction of starting to work is received, performing signature verification for the signature information in the upgrade file data according to the unique identification information of the upgraded diagnosis connector and the connector upgrade file;

if the signature verification is passed, allowing the upgraded diagnosis connector to work; or if the signature verification is not passed, stopping working of the upgraded diagnosis connector.

Optionally, before obtaining the upgrade file data sent by the upper computer of the diagnostic equipment, the method further comprises:

receiving an access request sent from the upper computer of the diagnostic equipment;

verifying a legality of the access request;

if the verification is passed, allowing the upper computer to transmit the upgraded file data;

if the verification is not passed, prohibiting the upper computer from transmitting the upgraded file data.

In a second aspect, a device for verifying upgrade of diagnosis connector of diagnostic equipment is provided, wherein the device for verifying upgrade of a diagnosis connector of diagnostic equipment is arranged in the diagnosis connector of the diagnostic equipment and comprises:

an upgrade data obtaining module configure to obtain upgrade file data sent from an upper computer of the diagnostic equipment, wherein the upgrade file data comprises a connector upgrade file and signature information, the signature information is generated previously according to unique identification information of a designated connector and the connector upgrade file, and the designated connector is the diagnosis connector that corresponds to a requester that requests a server to provide the connector upgrade file;

a signature verification module configured to perform signature verification for the signature information in the upgrade file data according to the unique identification information of the diagnosis connector to be upgraded and the connector upgrade file;

an upgrade performing module configured to, if a signature verification is passed, upgrade the diagnosis connector to be upgraded according to the connector upgrade file; and an upgrade refusing module configured to, if the signature verification is not passed, refuse to use the connector upgrade file to upgrade the diagnosis connector to be upgraded.

Optionally, the upgrade data obtaining module comprises:

an encrypted file obtaining unit configured to obtain encrypted upgrade file sent by the upper computer of the diagnostic equipment, the encrypted upgrade file is generated by encrypting the connector upgrade file which carries the signature information; and a file decrypting unit configured to decrypt the encrypted upgrade file to obtain the upgrade file data.

Optionally, the device for verifying upgrade of diagnosis connector further comprises:

a working time verifying module configured to verify the signature information in the upgrade file data according to the unique identification information of the upgraded diagnosis connector and the connector upgrade file when receiving an instruction of starting to working;

a work allowing module configured to, if the signature verification is passed, allow the upgraded diagnosis connector to work;

a work stopping module configured to, if the signature verification is not passed, stop working of the upgraded diagnosis connector.

Optionally, the device for verifying upgrade of diagnosis connector further comprises:

an access request receiving module configured to receive an access request sent by the upper computer of the diagnostic equipment;

a legality verifying module configured to verify a legality of the access request;

a transmitting allowing module configured to, if the verification is passed, allow the upper computer to transmit the upgraded file data; and a transmitting prohibiting module configured to, if the verification is not passed, prohibit the upper computer from transmitting the upgraded file data.

In a third aspect, a diagnosis connector of diagnostic equipment comprising a storage device is provided, the diagnosis connector comprises a processor and computer programs stored in the storage device and executable on the processor, the processor implements the aforesaid steps of the method for verifying upgrade of diagnosis connector of diagnostic equipment when executing the computer programs.

In a fourth aspect, a computer readable storage medium is provided, the computer readable storage medium stores computer program, the computer program implements the aforesaid steps of the method for verifying upgrade of diagnosis connector of diagnostic equipment when being executed by a processor.

Advantageous Effects

It can be seen from the technical solutions described above that the embodiments of the present application have following advantages:

In this embodiment, the diagnosis connector to be upgraded obtains the upgrade file data sent by the upper computer of the diagnostic equipment firstly, the upgrade file data comprises the connector upgrade file and the signature information, the signature information is generated previously according to the unique identification information of the designated connector and the connector upgrade file, the designated connector is the diagnosis connector corresponding to the requester that request the server to provide the connector upgrade file; then, the signature verification for the signature information in the upgrade file data is performed according to the unique identification information of the diagnosis connector to be upgraded and the connector upgrade file. If the signature verification is passed, the connector upgrade file is used to upgrade the diagnosis connector to be upgraded; if the signature verification is not passed, using the connector upgrade file to upgrade the diagnosis connector to be upgraded is refused. In this embodiment, the unique identification information of the diagnosis connector to be upgraded is used to perform the signature verification for the diagnosis connector to be upgraded; if the signature verification is passed, it means that the diagnosis connector to be upgraded is the same as the diagnosis connector corresponding to the requester, and it is ensured that each connector upgrade file provided by the server is only used for upgrading one corresponding diagnosis connector, such that illegal person are prevented from implementing an illegal upgrade for the diagnosis connector of the diagnostic equipment by means of cloning, and a potential risk of the diagnostic equipment is reduced.

BRIEF DESCRIPTION OF THE DRAWINGS

In order to explain the embodiments of the present application or the technical solutions in the prior art more clearly, a brief introduction regarding the accompanying drawings that need to be used for describing the embodiments or the prior art is given below; it is obvious that the accompanying drawings described as follows are only some embodiments of the present application, for those skilled in the art, other drawings can be obtained according to the current drawings on the premise of paying no creative labor.

DETAILED DESCRIPTION OF THE PREFERRED EMBODIMENTS

The embodiments of the present application provide a method and device for verifying upgrade of diagnosis connector of diagnostic equipment, and the diagnosis connector, which aim at solving a technical problem that an illegal person implements an illegal upgrade for the diagnosis connector of the diagnostic equipment by cloning.

In order to make the purpose, technical features and advantages of the present application be more obvious and more understandable, technical solutions in the embodiments of the present application will be described clearly and comprehensively with reference to accompanying drawings in the embodiments, it is obvious that, the embodiments described below are merely part of the embodiments of the present application, but not the whole of the embodiments. Based on the embodiments in the present application, some other embodiments, which are obtained by one of ordinary skill in the art at the premise of paying no creative labor, are all included in the protection scope of the present application.

Figure 1:
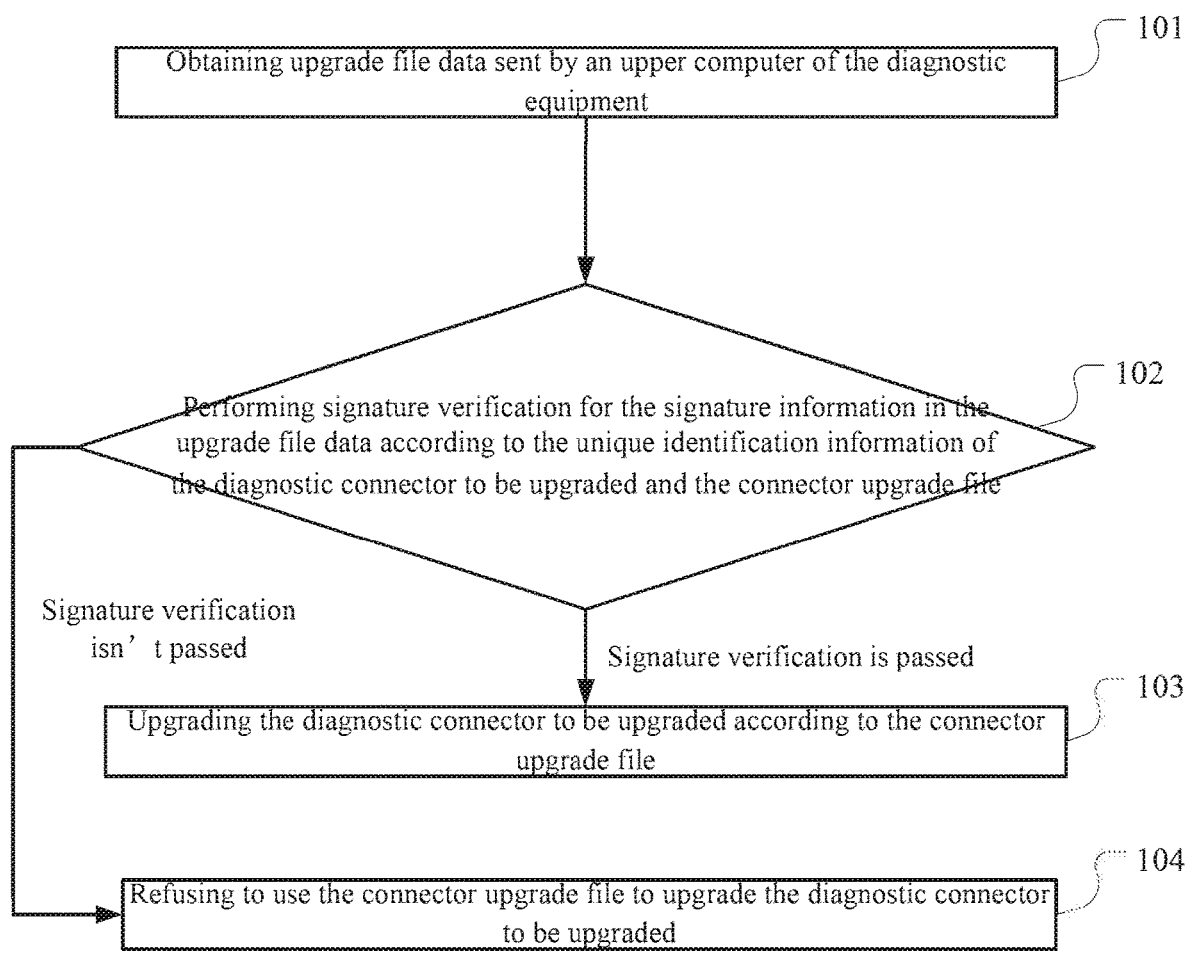
FIG. 1 illustrates an exemplary flow chart of a method for verifying upgrade of diagnosis connector of diagnostic equipment in one embodiment of the present application.

Please refer to FIG. 1, in embodiments of the present application, one example of a method for verifying upgrade of the diagnosis connector of the diagnostic equipment comprises:

step 101, obtaining upgrade file data sent by an upper computer of the diagnostic equipment, the upgrade file data comprises a connector upgrade file and signature information, the signature information is generated previously according to unique identification information of a designated connector and the connector upgrade file, the designated connector is the diagnosis connector corresponding to a requester that requests a server to provide the connector upgrade file.

In this embodiment, the method for verifying upgrade of diagnosis connector of diagnostic equipment is applied in the diagnosis connector of the diagnostic equipment. It can be understood that, when it needs to upgrade the diagnosis connector, a user can uses the upper computer of the diagnostic equipment to send the upgrade file data to the diagnosis connector of the diagnostic equipment, such that the diagnosis connector to be upgraded can obtain the upgrade file data.

It needs to be explained that, communication approaches such as USB, Wi-Fi (Wireless Fidelity), Bluetooth, RJ45, and so on can be used for communication between the upper computer and the diagnosis connector.

Wherein, the upgrade file data comprises the connector upgrade file and the signature information, the signature information is generated previously according to the unique identification information of the designated connector and the connector upgrade file, the designated connector is the diagnosis connector corresponding to the requester that requests the server to provide the connector upgrade file. The aforesaid unique identification information can include a serial number of the designated connector and a unique ID (Identity) of a chip of the designated connector. For facilitating understanding the origination of the upgrade file data, a generating process of the upgrade file data will be described below by an application scenario.

Figure 2:
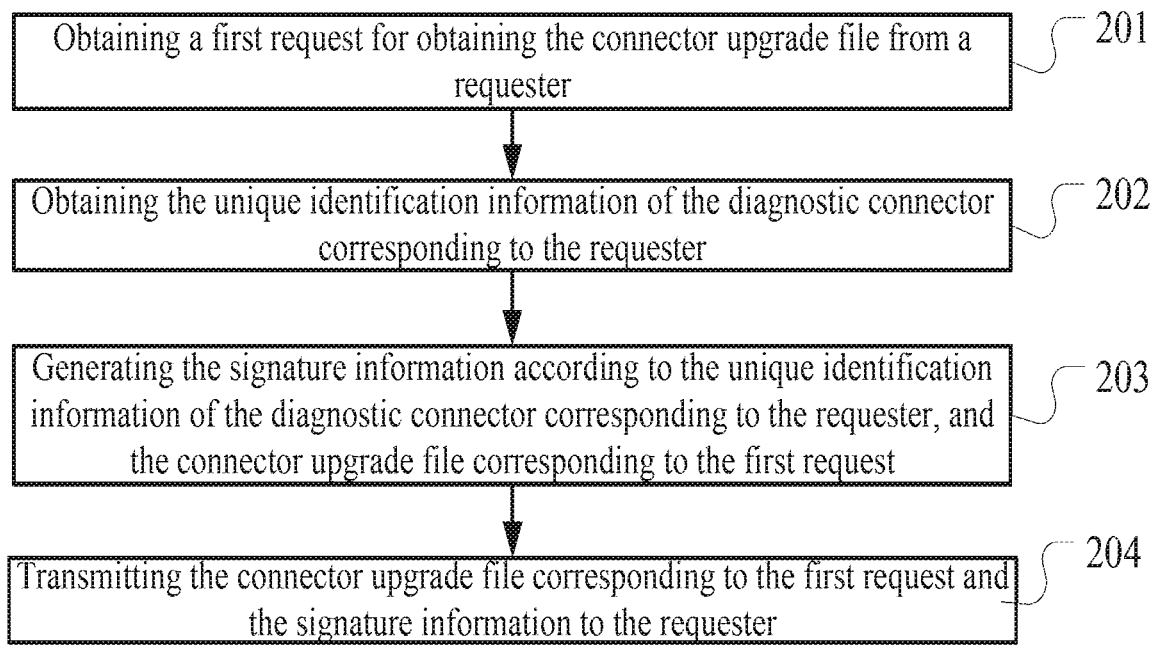
FIG. 2 illustrates an exemplary flow chart of a method for processing upgrade files of the diagnosis connector in another embodiment of the present application.

Please refer to FIG. 2, an embodiment of a method for processing upgrade files of diagnosis connector provided by the present application comprises:

step 201, receiving a first request for obtaining the connector upgrade file from the requester;

step 202, obtaining the unique identification information of the diagnosis connector corresponding to the requester;

step 203, generating the signature information according to the unique identification information of the diagnosis connector corresponding to the requester and the connector upgrade file corresponding to the first request; and step 204, sending the connector upgrade file corresponding to the first request and the signature information to the requester.

Regarding the aforesaid step 201, it can be understood that, the requester (e.g., a client-side used by the user) sends a request for obtaining the connector upgrade file to a server, that is, the first request, so that the server can receive the first request.

It needs to be explained that, the connector upgrade file can be generated previously by a compile software, and then uploaded to the server to be stored. For example, compiler software such as IAR Embedded Workbench IDE, Keil Embedded Development Tools for Arm, and so on can be used to generate BIN file of the diagnosis connector, the BIN file doesn't carry the signature information and is uploaded to the server.

The server described in this embodiment can be a designated software version distribution platform, or a third software publishing website, etc.

Regarding the aforesaid step 202, after the server receives the first request, it needs to obtain the unique identification information of the diagnosis connector corresponding to the requester. The unique identification information described herein is referred to as the serial number of the diagnosis connector and the unique ID of the chip of the diagnosis connector. For example, the server can request that, before the requester initiates a request, a login account on the server be registered previously, and relevant information of the diagnosis connector corresponding to the requester including the unique identification information be provided simultaneously at the time of registering the login account.

Regarding the aforesaid step 203, in particular, the server can perform a MD5 (The Fifth Version of Message Digest Algorithm) calculation for the connector upgrade file corresponding to the first request, and the unique identification information of the diagnosis connector corresponding to the requester (i.e., the serial number of the diagnosis connector and the unique ID), obtain a computed result, and then use a signature private key to sign on the computed result, and take the signed result as the signature information. Wherein, algorithms used for signature can be RSA digital signature algorithm. The aforesaid signature private key is assigned to the server previously, and a corresponding public key is assigned to the diagnostic equipment previously.

Regarding the aforesaid step 204, after generating the signature information, the server can associate the signature information with the connector upgrade file and then transmit the signature information and the connector upgrade file to the requester. Specifically, the signature information can be added into a tail end of the connector upgrade file to generate the connector upgrade file carrying signature information, and then the connector upgrade file can be transmitted to the requester.

Preferably, regarding the aforesaid step 204, in order to further improve a safety of data, before sending the file to the requester, the server can also encrypt the connector upgrade file corresponding to the first request and the signature information to generate the encrypted upgrade file, and then send the encrypted upgrade file to the requester. Wherein, the encryption processing can adopt encryption algorithms such as AES (Advanced Encryption Standard) Symmetric Encryption Algorithm, Asymmetric Encryption Algorithm, and so on.

Further, in order to further improve the safety of the upgrade file data, the upgrade file data obtained by the user via the client-side may have been encrypted. Therefore, the aforesaid step 101 in an application scenario can include: firstly, obtaining the encrypted upgrade file sent by the upper computer of the diagnostic equipment, the encrypted upgrade file is generated by encrypting the connector upgrade file carrying the signature information; then, decrypting the encrypted upgrade file, and obtaining the upgrade file data.

Figure 3:
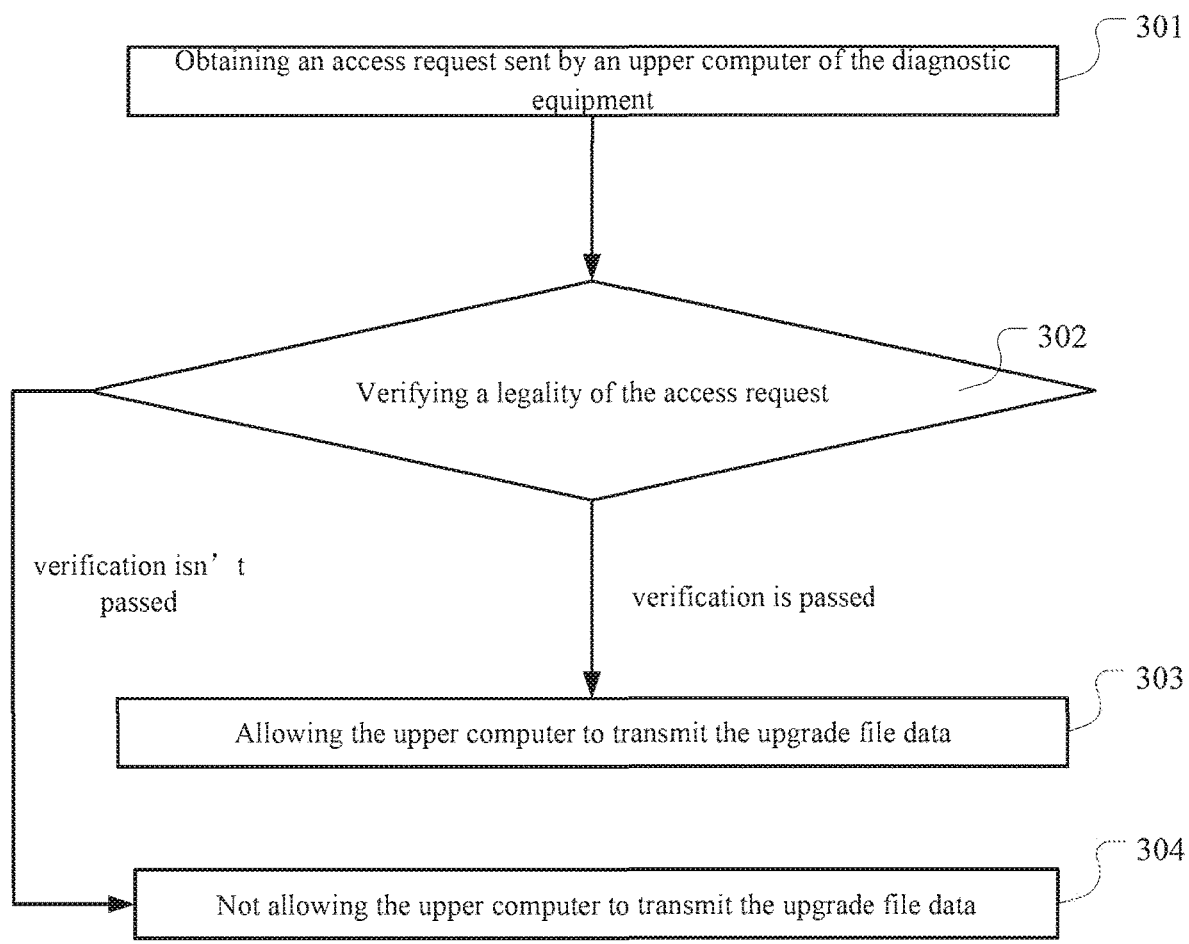
FIG. 3 illustrates a schematic flow chart of verifying legality of accessing of an upper computer in an application scenario of the method for verifying upgrade of the diagnosis connector of the diagnostic equipment in one embodiment of the present application.

Furthermore, as shown in FIG. 3, before step 101, the diagnosis connector can also perform verification for legality of accessing of the upper computer, which specifically comprises: step 301, receiving an access request sent by the upper computer of the diagnostic equipment;

step 302, verifying the legality of the access request, if a verification is passed, executing a step 303, if the verification is not passed, executing a step 304;

step 303, allowing the upper computer to transmit the upgrade file data;

step 304, prohibiting the upper computer from transmitting the upgrade file data.

Regarding the aforesaid steps 301-304, it can be understood that, when the upper computer upgrades programs of the lower computer of the diagnostic equipment, it needs to obtain a certain access authority such as a booting access. Therefore, the upper computer of the diagnostic equipment needs to transmit an access request to the diagnosis connector of the diagnostic equipment. After receiving the access request, the diagnosis connector verifies the legality of the access request, if the verification is passed, the upper computer is allowed to transmit the upgrade file data to the diagnosis connector; otherwise, the access request from the upper computer is rejected. Furthermore, after the verification is passed, generally speaking, the upper computer still needs to transmit an instruction request for upgrading the lower computer to the diagnostic equipment, after the instruction request is transmitted to the diagnosis connector, if the instruction request is executed successfully, following steps can be executed, after the diagnosis connector enters in an upgrading lower computer status successfully, subsequent steps can be executed, such that the upper computer is allowed to transmit the upgrade file data, otherwise, an upgrading operation is ended.

Step 102, performing signature verification for the signature information in the upgrade file data according to the unique identification information of the diagnosis connector to be upgraded and the connector upgrade file, if the signature verification is passed, executing step 103, if the signature verification is not passed, executing step 104;

step 103, using the connector upgrade file to upgrade the diagnosis connector to be upgraded;

step 104, refusing to use the connector upgrade file to upgrade the diagnosis connector to be upgraded.

Regarding the aforesaid step 102-104, specifically, the diagnosis connector performs the MD5 calculation for received data excluding the signature information, and the unique identification information to be upgraded, and the obtained computed result is referred to as the first computed result. The aforesaid unique identification information of the diagnosis connector to be upgraded can be, particularly, the serial number of the diagnosis connector to be upgraded, and the unique ID of the diagnosis connector chip.

The diagnosis connector uses a preset public key to perform a verification for the signature information and the first computed result; if the verification is passed, it can be considered that the diagnosis connector to be upgraded and the designated connector corresponding to the connector upgrade file belong to the same diagnosis connector, such that an upgrading operation for the diagnosis connector to be upgraded can be performed; if the verification is not passed, it can be considered that the diagnosis connector to be upgraded and the designated connector corresponding to the connector upgrade file don't belong to the same diagnosis connector, and thereby refusing to use the connector upgrade file to upgrade the diagnosis connector to be upgraded.

It needs to be explained that, in the steps 102-104, after obtaining the connector upgrade file, the diagnosis connector can store the connector upgrade file in a temporary buffer area temporarily, after the signature verification is passed and when step 103 is executed, the connector upgrade file in the temporary buffer area is written into a Flash of the diagnosis connector to accomplish upgrading. However, if the signature verification is not passed, these connector upgrade files and relevant data in the temporary buffer area can be cleared.

Figure 4:
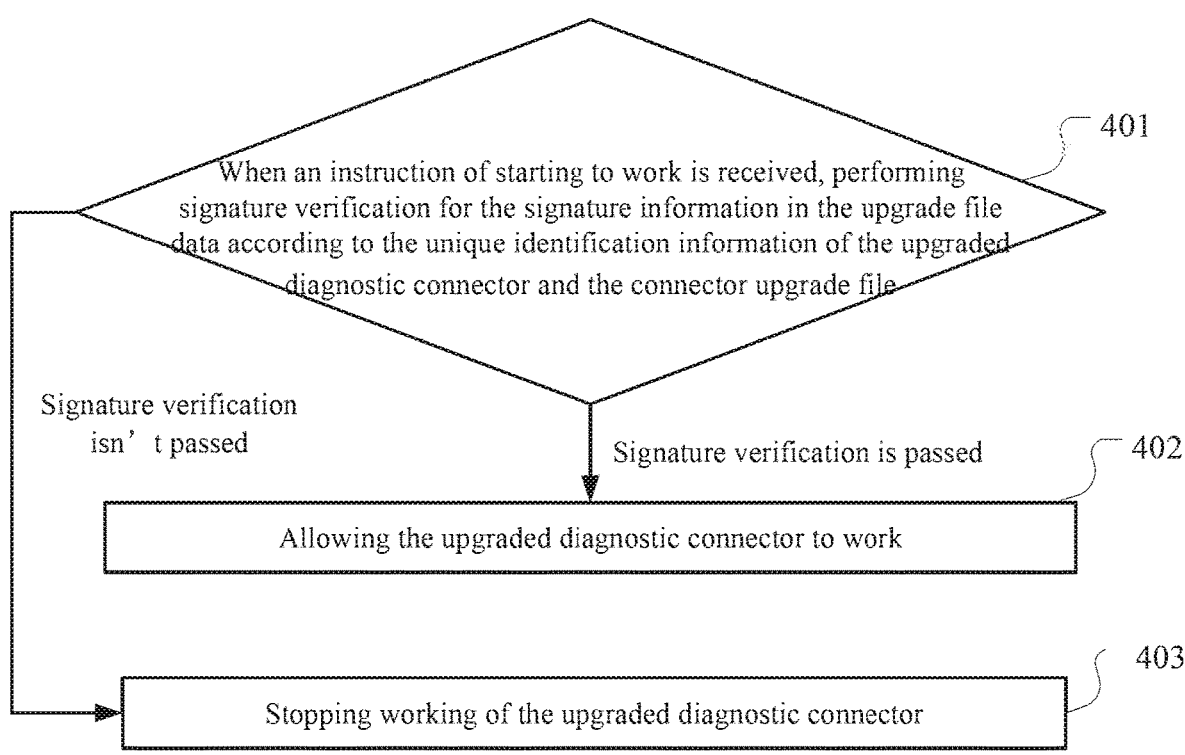
FIG. 4 illustrates a schematic flow chart of verifying a working process after upgrading in an application scenario of the method for verifying upgrade of the diagnosis connector of the diagnostic equipment in embodiment of the present application.

Furthermore, after the connector upgrade file is used to upgrade the diagnosis connector to be upgraded, in order to prevent the connector from being written into the diagnosis connector illegally to be upgraded, and skipping the aforesaid verification process, in this embodiment, it is also possible to perform a verification for a whole working process of the diagnosis connector after upgrading; only when the verification is passed, the diagnosis connector can be allowed to go on working. As shown in FIG. 4, the verification comprises:

step 401, when an instruction of starting to work is received, performing a signature verification for the signature information in the upgrade file data according to the unique identification information of the upgraded diagnosis connector and the connector upgrade file;

step 402, if the signature verification is passed, allowing the upgraded diagnosis connector to work;

step 403, if the signature verification is not passed, stopping working of the upgraded diagnosis connector.

Regarding the aforesaid steps 401-403, it can be understood that, the principle of the aforesaid verification process is similar to the principle of the aforesaid steps 102-104, the difference between steps 401-403 and steps 102-104 is that: in steps 401-403, a verification and monitoring of the working process of the diagnosis connector after upgrading performed, however, in steps 102-104, a verification of the legality of the connector upgrade file of the diagnosis connector before upgrading is performed.

In this embodiment, the diagnosis connector to be upgraded obtains the upgrade file data sent by the upper computer of the diagnostic equipment firstly, the upgrade file data comprises the connector upgrade file and the signature information, the signature information is generated previously according to the unique identification information of the designated connector and the connector upgrade file, the designated connector is the diagnosis connector corresponding to the requester that request the server to provide the connector upgrade file; then, the signature verification for the signature information in the upgrade file data is performed according to the unique identification information of the diagnosis connector to be upgraded and the connector upgrade file. If the signature verification is passed, the connector upgrade file is used to upgrade the diagnosis connector to be upgraded; if the signature verification is not passed, using the connector upgrade file to upgrade the diagnosis connector to be upgraded is refused. In this embodiment, the unique identification information of the diagnosis connector to be upgraded is used to perform the signature verification for the diagnosis connector to be upgraded; if the signature verification is passed, it means that the diagnosis connector to be upgraded is the same as the diagnosis connector corresponding to the requester, and it is ensured that each connector upgrade file provided by the server can be only used for upgrading one corresponding diagnosis connector, an illegal upgrade of a diagnosis connector of the diagnostic equipment carried out by an illegal person by cloning is excluded, and a potential risk of the diagnostic equipment is reduced.

It should be understood that, value of serial number of the steps in the aforesaid embodiment does not mean a sequencing of execution sequences of the steps, the execution sequence of each of the steps should be determined by functionalities and internal logics of the steps themselves, and shouldn't be regarded as limitation to an implementation process of the embodiment of the present application.

A method for verifying upgrade of diagnosis connector of diagnostic equipment is mainly described above, and a device for verifying upgrade of diagnosis connector of diagnostic equipment will be described in detail below.

Figure 5:
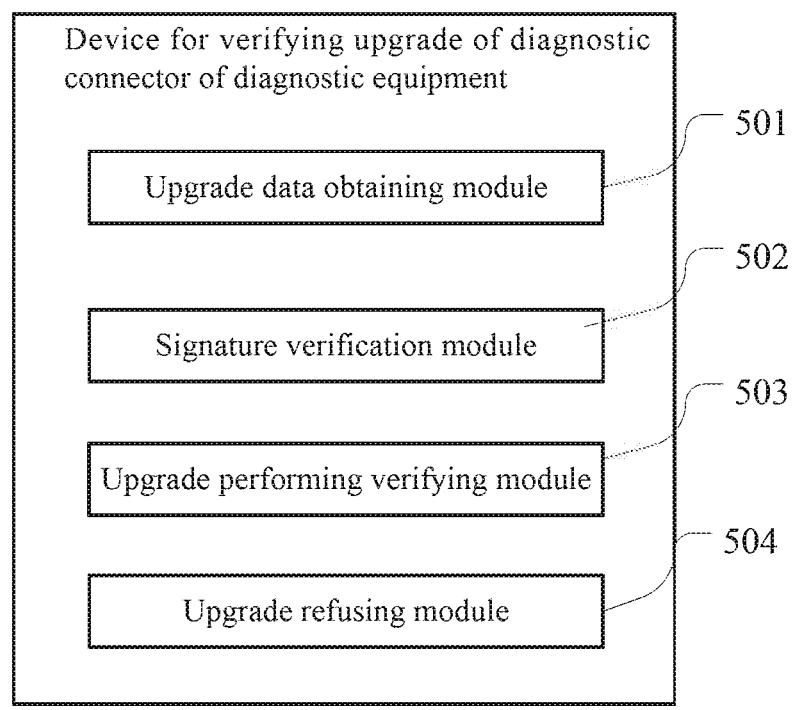
FIG. 5 illustrates an exemplary structural diagram of a device for verifying upgrade of a diagnosis connector of a diagnostic equipment in another embodiment of the present application.

FIG. 5 illustrates an exemplified structural view of a device for verifying upgrade of diagnosis connector of diagnostic equipment in another embodiment of the present application.

In this embodiment, there is a device for verifying upgrade of the diagnosis connector of the diagnostic equipment, the device for verifying upgrade of the diagnosis connector of the diagnostic equipment is arranged in the diagnosis connector of the diagnostic equipment and comprises:

an upgrade data obtaining module 501 configured to obtain upgrade file data sent from an upper computer of the diagnostic equipment, the upgrade file data comprises a connector upgrade file and signature information, the signature information is generated previously according to unique identification information of a designated connector and the connector upgrade file, the designated connector is the diagnosis connector corresponding to a requester that requests a server to provide the connector upgrade file;

a signature verification module 502 configured to perform signature verification for the signature information in the upgrade file data according to the unique identification information of the diagnosis connector to be upgraded and the connector upgrade file;

an upgrade performing module 503 configured to, if the signature verification is passed, upgrade the diagnosis connector to be upgraded according to the connector upgrade file; and an upgrade refusing module 504 configured to, if the signature verification is not passed, refuse to use the connector upgrade file to upgrade the diagnosis connector to be upgraded.

Further, the upgrade data obtaining module 501 can comprise:

an encrypted file obtaining unit configured to obtain encrypted upgrade file sent by the upper computer of the diagnostic equipment, wherein the encrypted upgrade file is generated by encrypting the connector upgrade file which carries the signature information; and a file decrypting unit configured to decrypt the encrypted upgrade file to obtain the upgrade file data.

Furthermore, the device for verifying upgrade of diagnosis connector can further comprise:

a working time verifying module configured to verify the signature information in the upgrade file data according to the unique identification information of the upgraded diagnosis connector and the connector upgrade file when receiving an instruction of starting to working;

a work allowing module configured to, if the working time verifying module gets a positive verification result, allow the upgraded diagnosis connector to work; and a work stopping module configured to, if the working time verifying module gets a negative verification result, stop working of the upgraded diagnosis connector.

Furthermore, the device for verifying upgrade of diagnosis connector can further comprise:

an access request receiving module configured to receive an access request sent by the upper computer of the diagnostic equipment;

a legality verifying module configured to verify a legality of the access request;

an upgrading allowing module configured to, if a verification is passed, allow the upper computer to transmit the upgraded file data; and an upgrading prohibiting module configured to, if the verification is not passed, prohibit the upper computer from transmitting the upgraded file data.

Figure 6:
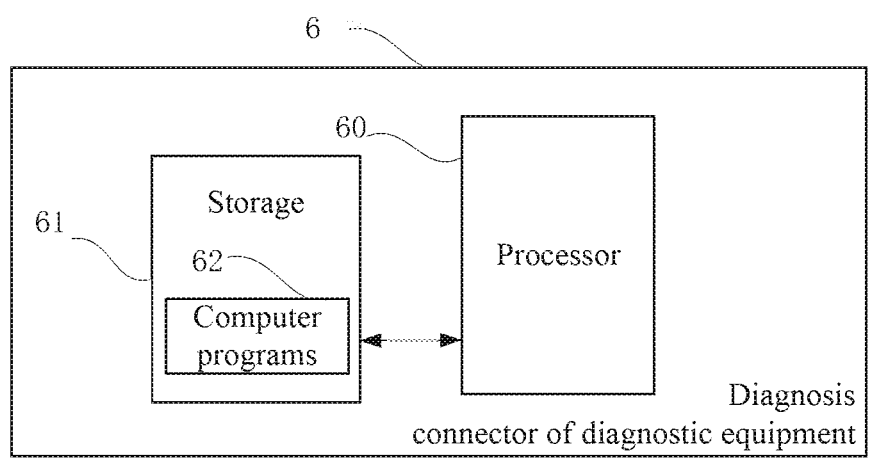
FIG. 6 illustrates a schematic view of the diagnosis connector of a diagnostic equipment in another embodiment of the present application.

FIG. 6 illustrates a schematic view of a diagnosis connector of diagnostic equipment provided by another embodiment of the present application. As shown in FIG. 6, a diagnosis connector 6 of the diagnostic equipment in this embodiment comprises: a processor 60, a storage device 61 and computer programs 62 stored in the storage device 61 and executable on the processor 60, such as the programs that serves to execute the method for verifying upgrade of the diagnosis connector of the diagnostic equipment.

When the processor 60 executes the computer programs 62, the following steps are implemented:

obtaining upgrade file data sent by an upper computer of the diagnostic equipment, the upgrade file data comprises a connector upgrade file and signature information, the signature information is generated previously according to unique identification information of a designated connector and the connector upgrade file, the designated connector is the diagnosis connector corresponding to a requester that requests a server to provide the connector upgrade file;

performing signature verification for the signature information in the upgrade file data according to the unique identification information of the diagnosis connector to be upgraded and the connector upgrade file;

if the signature verification is passed, upgrading the diagnosis connector to be upgraded according to the connector upgrade file; or if the signature verification is not passed, refusing to use the connector upgrade file to upgrade the diagnosis connector to be upgraded.

Optionally, obtaining the upgrade file data sent from the upper computer of the diagnostic equipment comprises:

obtaining encrypted upgrade file sent by the upper computer of the diagnostic equipment, the encrypted upgrade file is generated by encrypting the connector upgrade file which carries the signature information; and decrypting the encrypted upgrade file to obtain the upgrade file data.

Optionally, after using the connector upgrade file to upgrade the diagnosis connector to be upgraded, executing the computer programs 62 by the processor 60 further comprises:

when an instruction of starting to work is received, performing signature verification for the signature information in the upgrade file data according to the unique identification information of the upgraded diagnosis connector and the connector upgrade file;

if the signature verification is passed, allowing the upgraded diagnosis connector to work; or if the signature verification is not passed, stopping working of the upgraded diagnosis connector.

Optionally, before obtaining the upgrade file data sent by the upper computer of the diagnostic equipment, executing the computer programs 62 by the processor 60 further comprises:

receiving an access request sent from the upper computer of the diagnostic equipment;

verifying a legality of the access request;

if the verification is passed, allowing the upper computer to transmit the upgraded file data; if the verification is not passed, prohibiting the upper computer from transmitting the upgraded file data.

Exemplarily, the computer programs 62 can be divided into one or a plurality of module(s)/unit(s), the one or plurality of module(s)/unit(s) is/are stored in the storage device 61 and executed by the processor 60, thereby implementing the present application. The one or plurality of module(s)/unit(s) can be a series of computer program instruction segments capable of accomplishing specific functionalities, these instruction segments are used for describing an executive process of the computer programs 62 in the diagnosis connector 6 of the diagnostic equipment.

The diagnosis connector 6 of the diagnostic equipment can include but is not limited to the processor 60 and the storage device 61. It can be understood for the one of ordinary skill in the art that, FIG. 6 is merely an example of the diagnosis connector 6 of the diagnostic equipment, and is not constituted as limitation to the diagnosis connector 6 of the diagnostic equipment, the diagnosis connector 6 can include more or less components shown in FIG. 6, or combine some components or different components, for example, the diagnosis connector 6 of the diagnostic equipment can also include an input and output device, a network access device, a bus, and so on.

The processor 60 can be a CPU (Central Processing Unit), and can also be other general purpose processor, DSP (Digital Signal Processor), ASIC (Application Specific Integrated Circuit), FGPA (Field-Programmable Gate Array), or be some other programmable logic devices, discrete gate or transistor logic devices, discrete hardware components, etc. The general purpose processor can be a MCU (Micro Processing Unit), or alternatively, the processor can also be any conventional processor, etc.

The storage device 61 can be an internal storage unit of the diagnosis connector 6 of the diagnostic equipment, such as a hard disk or a memory of the diagnosis connector 6 of the diagnostic equipment. The storage device 61 can also be an external storage device of the diagnosis connector 6 of the diagnostic equipment, such as a plug-in hard disk, a SMC (Smart Media Card), a SD (Secure Digital) card, a FC (Flash Card) equipped on the lower computer 5 of the diagnostic equipment. Further, the storage device 61 may include both the internal storage unit and the external storage device of the diagnosis connector 6 of the diagnostic equipment, either. The storage device 61 is configured for storing the computer programs, and other procedures and data needed by the diagnosis connector 6 of the diagnostic equipment. The storage device 61 can also be configured for temporarily storing data that has been output or being ready to be output.

The various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by the computer programs configured to instruct relevant hardware. The computer programs can be stored in a computer readable storage medium, when the computer programs are executed by the processor, the following steps can be implemented:

obtaining upgrade file data sent by an upper computer of the diagnostic equipment, the upgrade file data comprises a connector upgrade file and signature information, the signature information is generated previously according to unique identification information of a designated connector and the connector upgrade file, the designated connector is the diagnosis connector corresponding to a requester that requests a server to provide the connector upgrade file;

performing signature verification for the signature information in the upgrade file data according to the unique identification information of the diagnosis connector to be upgraded and the connector upgrade file;

if the signature verification is passed, upgrading the diagnosis connector to be upgraded according to the connector upgrade file; or if the signature verification is not passed, refusing to use the connector upgrade file to upgrade the diagnosis connector to be upgraded.

Optionally, obtaining the upgrade file data sent from the upper computer of the diagnostic equipment comprises:

obtaining encrypted upgrade file sent by the upper computer of the diagnostic equipment, the encrypted upgrade file is generated by encrypting the connector upgrade file which carries the signature information; and decrypting the encrypted upgrade file to obtain the upgrade file data.

Optionally, after using the connector upgrade file to upgrade the diagnosis connector to be upgraded, when the computer programs are executed by the processor, the method further comprises:

when an instruction of starting to work is received, performing signature verification for the signature information in the upgrade file data according to the unique identification information of the upgraded diagnosis connector and the connector upgrade file;

if the signature verification is passed, allowing the upgraded diagnosis connector to work; or if the signature verification is not passed, stopping working of the upgraded diagnosis connector.

Optionally, before obtaining the upgrade file data sent by the upper computer of the diagnostic equipment, when the computer programs are executed by the processor, the method further comprises:

receiving an access request sent from the upper computer of the diagnostic equipment; verifying a legality of the access request;

if the verification is passed, allowing the upper computer to transmit the upgraded file data;

if the verification is not passed, prohibiting the upper computer from transmitting the upgraded file data.

Wherein, the computer programs comprise computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), and RAM (Random Access Memory).

As stated above, the aforesaid embodiments are only intended to explain but not to limit the technical solutions of the present application. Although the present application has been explained in detail with reference to the above-described embodiments, it should be understood for the one of ordinary skill in the art that, the technical solutions described in each of the above-described embodiments can still be amended, or some technical features in the technical solutions can be replaced equivalently; these amendments or equivalent replacements won't make the essential of corresponding technical solution to be broken away from the spirit and the scope of the technical solution in various embodiments of the present application.

What is claimed is:

1. A method for verifying upgrade of diagnosis connector of diagnostic equipment, wherein the method for verifying upgrade of diagnosis connector of diagnostic equipment is applied in the diagnosis connector of the diagnostic equipment and comprises:

obtaining upgrade file data sent by an upper computer of the diagnostic equipment, wherein the upgrade file data comprises a connector upgrade file and signature information, the signature information is generated previously according to unique identification information of a designated connector and the connector upgrade file, the designated connector is the diagnosis connector corresponding to a requester that requests a server to provide the connector upgrade file;

performing signature verification for the signature information in the upgrade file data according to the unique identification information of the diagnosis connector to be upgraded and the connector upgrade file;

upgrading the diagnosis connector to be upgraded according to the connector upgrade file if the signature verification is passed; or refusing to use the connector upgrade file to upgrade the diagnosis connector to be upgraded if the signature verification is not passed;

wherein before obtaining upgrade file data sent by the upper computer of the diagnostic equipment, the upper computer of the diagnostic equipment further implements:

receiving a first request for obtaining the connector upgrade file from a requester;

obtaining the unique identification information of the diagnosis connector corresponding to the requester;

generating the signature information according to the unique identification information of the diagnosis connector corresponding to the requester and the connector upgrade file corresponding to the first request; and sending the connector upgrade file corresponding to the first request and the signature information to the requester.

2. The method for verifying upgrade of diagnosis connector according to claim 1, wherein obtaining the upgrade file data sent by the upper computer of the diagnostic equipment comprises:

obtaining encrypted upgrade file sent by the upper computer of the diagnostic equipment, wherein the encrypted upgrade file is generated by encrypting the connector upgrade file that carries the signature information; and decrypting the encrypted upgrade file to obtain the upgrade file data.

3. The method for verifying upgrade of diagnosis connector according to claim 1, wherein, after using the connector upgrade file to upgrade the diagnosis connector to be upgraded, the method further comprises:

when an instruction of starting to work is received, performing signature verification for the signature information in the upgrade file data according to the unique identification information of the upgraded diagnosis connector and the connector upgrade file;

allowing the upgraded diagnosis connector to work if the signature verification is passed; or stopping working of the upgraded diagnosis connector if the signature verification is not passed.

4. The method for verifying upgrade of diagnosis connector according to claim 1, wherein before obtaining the upgrade file data sent by the upper computer of the diagnostic equipment, the method further comprises:

receiving an access request sent from the upper computer of the diagnostic equipment;

verifying a legality of the access request;

allowing the upper computer to transmit the upgraded file data if the verification is passed; or prohibiting the upper computer from transmitting the upgraded file data if the verification is not passed.

5. The method for verifying upgrade of diagnosis connector according to claim 1, wherein obtaining the upgrade file data sent by the upper computer of the diagnostic equipment comprises:

obtaining encrypted upgrade file sent by the upper computer of the diagnostic equipment, wherein the encrypted upgrade file is generated by encrypting the connector upgrade file that carries the signature information; and decrypting the encrypted upgrade file to obtain the upgrade file data;

before obtaining the upgrade file data sent by the upper computer of the diagnostic equipment, the method further comprises:

receiving an access request sent from the upper computer of the diagnostic equipment;

verifying a legality of the access request;

allowing the upper computer to transmit the upgraded file data if the verification is passed; or prohibiting the upper computer from transmitting the upgraded file data if the verification is not passed.

6. The method for verifying upgrade of diagnosis connector according to claim 1, wherein after using the connector upgrade file to upgrade the diagnosis connector to be upgraded, the method further comprises:

performing signature verification for the signature information in the upgrade file data according to the unique identification information of the upgraded diagnosis connector and the connector upgrade file when an instruction of starting to work is received;

allowing the upgraded diagnosis connector to work if the signature verification is passed; or stopping working of the upgraded diagnosis connector if the signature verification is not passed;

before obtaining the upgrade file data sent by the upper computer of the diagnostic equipment, the method further comprises:

receiving an access request sent from the upper computer of the diagnostic equipment;

verifying a legality of the access request;

allowing the upper computer to transmit the upgraded file data if the verification is passed; or prohibiting the upper computer from transmitting the upgraded file data if the verification is not passed.

7. The method for verifying upgrade of diagnosis connector according to claim 1, wherein receiving the first request for obtaining the connector upgrade file from the requester further comprises:

the connector upgrade file being a BIN file of the diagnosis connector; the BIN file being generated previously by a compile software, and then uploaded to the server to be stored; the BIN file not carrying the signature information and being uploaded to the server.

8. The method for verifying upgrade of diagnosis connector according to claim 1, wherein obtaining the unique identification information of the diagnosis connector corresponding to the requester further comprises:

before the requester initiating the first request, a login account on the server being registered previously, and relevant information of the diagnosis connector corresponding to the requester including the unique identification information being provided simultaneously at the time of registering the login account.

9. The method for verifying upgrade of diagnosis connector according to claim 1, wherein generating the signature information according to the unique identification information of the diagnosis connector corresponding to the requester and the connector upgrade file corresponding to the first request comprises:

performing an MD5 (The Fifth Version of Message Digest Algorithm) calculation for the unique identification information of the diagnosis connector corresponding to the requester and the connector upgrade file corresponding to the first request, obtaining a computed result, and then using a signature private key to sign on the computed result, and taking the signed result as a signature information, the signature private key being assigned to the server previously, and a corresponding public key being assigned to the diagnostic equipment previously.

10. The method for verifying upgrade of diagnosis connector according to claim 1, wherein sending the connector upgrade file corresponding to the first request and the signature information to the requester further comprises:

after the signature information being generated, the signature information being added into a tail end of the connector upgrade file to generate a connector upgrade file carrying signature information, then the connector upgrade file carrying signature information being further encrypted according to AES (Advanced Encryption Standard) Symmetric Encryption Algorithm and/or Asymmetric Encryption Algorithm and then the connector upgrade file corresponding to the first request and the signature information being sent to the requester.

11. A diagnosis connector of diagnostic equipment comprising a storage device, a processor and computer programs stored in the storage device and executable on the processor, wherein the processor is configured to execute the computer programs stored in the storage device to implement:

obtaining upgrade file data sent by an upper computer of the diagnostic equipment, wherein the upgrade file data comprises a connector upgrade file and signature information, the signature information is generated previously according to unique identification information of a designated connector and the connector upgrade file, the designated connector is the diagnosis connector corresponding to a requester that requests a server to provide the connector upgrade file;

performing signature verification for the signature information in the upgrade file data according to the unique identification information of the diagnosis connector to be upgraded and the connector upgrade file;

upgrading the diagnosis connector to be upgraded according to the connector upgrade file if the signature verification is passed; or refusing to use the connector upgrade file to upgrade the diagnosis connector to be upgraded if the signature verification is not passed;

wherein before obtaining upgrade file data sent by the upper computer of the diagnostic equipment, the upper computer of the diagnostic equipment further implements;

receiving a first request for obtaining the connector upgrade file from a requester;

obtaining the unique identification information of the diagnosis connector corresponding to the requester;

generating the signature information according to the unique identification information of the diagnosis connector corresponding to the requester and the connector upgrade file corresponding to the first request; and sending the connector upgrade file corresponding to the first request and the signature information to the requester.

12. A non-transitory computer readable storage medium which stores computer programs, wherein when the computer programs implement steps of the method for verifying upgrade of diagnosis connector of diagnostic equipment according to claim 1 when being executed by a processor.

13. The diagnosis connector of diagnostic equipment according to claim 11, wherein the processor is further configured to execute the computer programs stored in the storage device to implement:

obtaining encrypted upgrade file sent by the upper computer of the diagnostic equipment, wherein the encrypted upgrade file is generated by encrypting the connector upgrade file that carries the signature information; and decrypting the encrypted upgrade file to obtain the upgrade file data.

14. The diagnosis connector of diagnostic equipment according to claim 11, wherein after using the connector upgrade file to upgrade the diagnosis connector to be upgraded, the processor is further configured to execute the computer programs stored in the storage device to implement:

performing signature verification for the signature information in the upgrade file data according to the unique identification information of the upgraded diagnosis connector and the connector upgrade file when an instruction of starting to work is received;

allowing the upgraded diagnosis connector to work if the signature verification is passed; or stopping working of the upgraded diagnosis connector if the signature verification is not passed.

15. The diagnosis connector of diagnostic equipment according to claim 11, wherein before obtaining the upgrade file data sent by the upper computer of the diagnostic equipment, the processor is further configured to execute the computer programs stored in the storage device to implement:

receiving an access request sent from the upper computer of the diagnostic equipment;

verifying a legality of the access request;

allowing the upper computer to transmit the upgraded file data if the verification is passed; or prohibiting the upper computer from transmitting the upgraded file data if the verification is not passed.

16. The diagnosis connector of diagnostic equipment according to claim 13, wherein before obtaining the upgrade file data sent by the upper computer of the diagnostic equipment, the processor is further configured to execute the computer programs stored in the storage device to implement:

receiving an access request sent from the upper computer of the diagnostic equipment;

verifying a legality of the access request;

allowing the upper computer to transmit the upgraded file data if the verification is passed; or prohibiting the upper computer from transmitting the upgraded file data if the verification is not passed.

17. The diagnosis connector of diagnostic equipment according to claim 14, wherein before obtaining the upgrade file data sent by the upper computer of the diagnostic equipment, the processor is further configured to execute the computer programs stored in the storage device to implement:

receiving an access request sent from the upper computer of the diagnostic equipment;
verifying a legality of the access request;
allowing the upper computer to transmit the upgraded file data if the verification is passed; or
prohibiting the upper computer from transmitting the upgraded file data if the verification is not passed.

\* \* \* \* \*